Figure 1:
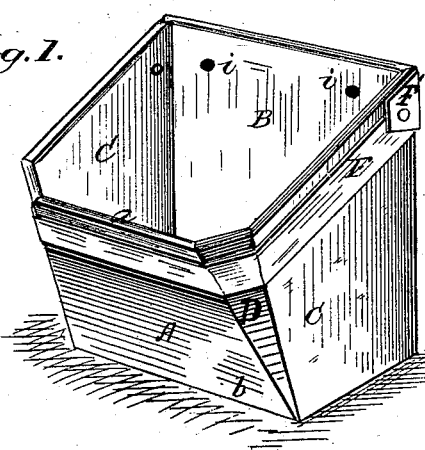
Figure 2:
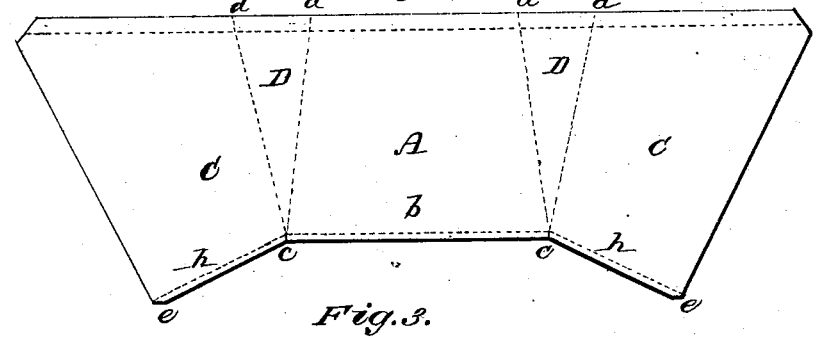
Figure 3:
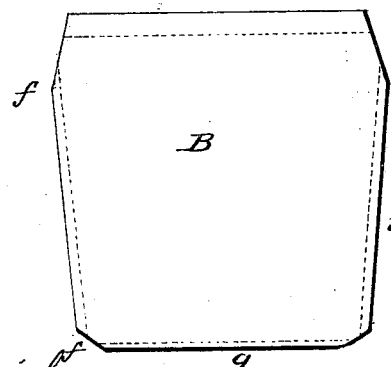
Figure 4:
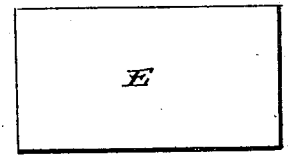

(Model.)

C. D. COWGILL.
Elevator Bucket.

No. 228,875.        Patented June 15, 1880.

WITNESSES
Fred. G. Dieterich
Albert H. Krause

INVENTOR:
Christian D. Cowgill
by Louis Bagger & Co.
ATTORNEYS

R. P. DAVIS.
Baling Press.
No. 228,876. Patented June 15, 1880.
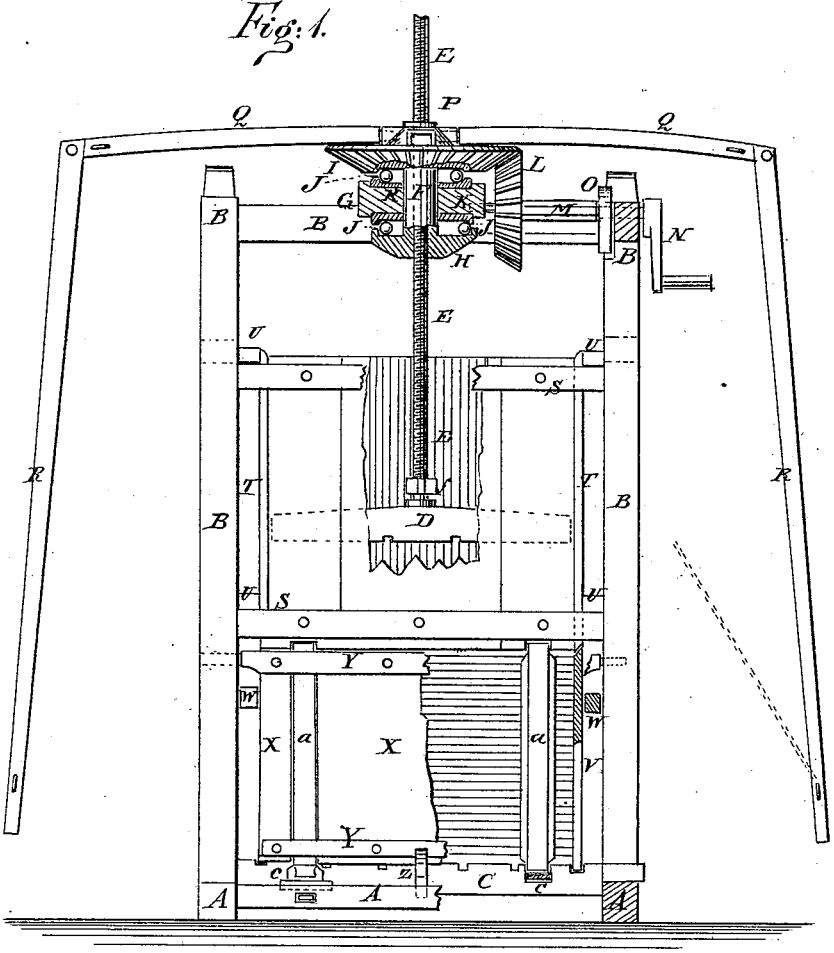
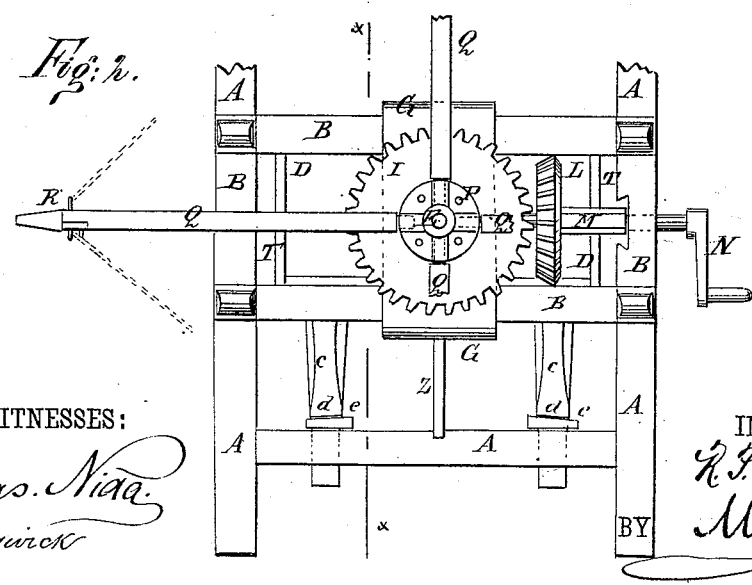
WITNESSES:
Chas. Nida
C. Sedgwick
INVENTOR:
R. P. Davis
BY Munn & Co
ATTORNEYS.